United States Patent
Moore

(10) Patent No.: US 9,921,078 B2
(45) Date of Patent: Mar. 20, 2018

(54) PERSONAL NAVIGATION ASSISTANCE SYSTEMS AND METHODS

(71) Applicant: Verizon Patent and Licensing Inc., Arlington, VA (US)

(72) Inventor: Allen Moore, Florence, AL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/339,714

(22) Filed: Oct. 31, 2016

(65) Prior Publication Data

US 2017/0045373 A1 Feb. 16, 2017

Related U.S. Application Data

(63) Continuation of application No. 14/579,989, filed on Dec. 22, 2014, now Pat. No. 9,547,988.

(51) Int. Cl.
*G01C 21/00* (2006.01)
*G01C 21/36* (2006.01)
*G08G 1/14* (2006.01)
*G08G 1/01* (2006.01)

(52) U.S. Cl.
CPC ....... *G01C 21/3685* (2013.01); *G08G 1/0133* (2013.01); *G08G 1/14* (2013.01); *G08G 1/143* (2013.01); *G08G 1/146* (2013.01); *G08G 1/147* (2013.01)

(58) Field of Classification Search
CPC .................. G01C 21/3685; G08G 1/0133
See application file for complete search history.

(56) References Cited

U.S. PATENT DOCUMENTS

| | | | | |
|---|---|---|---|---|
| 2014/0249742 A1* | 9/2014 | Krivacic | ............... | G06Q 10/02 701/400 |
| 2015/0123818 A1* | 5/2015 | Sellschopp | ......... | G01C 21/3484 340/932.2 |
| 2015/0360720 A1* | 12/2015 | Li | ......................... | B62D 15/027 701/400 |
| 2016/0019790 A1* | 1/2016 | Tobolski | ................ | G06Q 10/02 340/932.2 |

* cited by examiner

*Primary Examiner* — Adam M Alharbi

(57) ABSTRACT

An exemplary method includes a personal navigation assistance system detecting an upcoming trip of a user to a destination, accessing data associated with the upcoming trip from a plurality of disparate information sources, aggregating the accessed data associated with the upcoming trip, generating, based on the aggregated data, navigational assistance content for the upcoming trip, and providing the navigational assistance content for the upcoming trip to a computing device for presentation to the user. In certain examples, aggregated data includes real-time parking space availability information, and the navigational assistance content includes parking assistance content generated based on the real-time parking space availability information. Corresponding systems and methods are also described.

17 Claims, 11 Drawing Sheets

PERSONAL NAVIGATION ASSISTANCE SYSTEMS AND METHODS

RELATED APPLICATIONS

This application is a continuation application of U.S. patent application Ser. No. 14/579,989, filed Dec. 22, 2014, and entitled "Personal Navigation Assistance Systems and Methods", which is hereby incorporated by reference in its entirety.

BACKGROUND INFORMATION

Personal navigation systems have become fairly prevalent in recent years. A user of a computing device is able to access and use such a navigation system to find a destination. For example, a conventional navigation system may provide navigational guidance in the form of a digital street map of a geographic area surrounding the user and/or turn-by-turn driving directions to guide the user to the destination.

While conventional navigation systems have benefited users of computing devices, there remains room for improvement. For example, conventional navigation systems are limited in the information they can use to generate navigational guidance, how the information is used to generate the navigational guidance, and/or in the information contained in the navigational guidance provided to users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
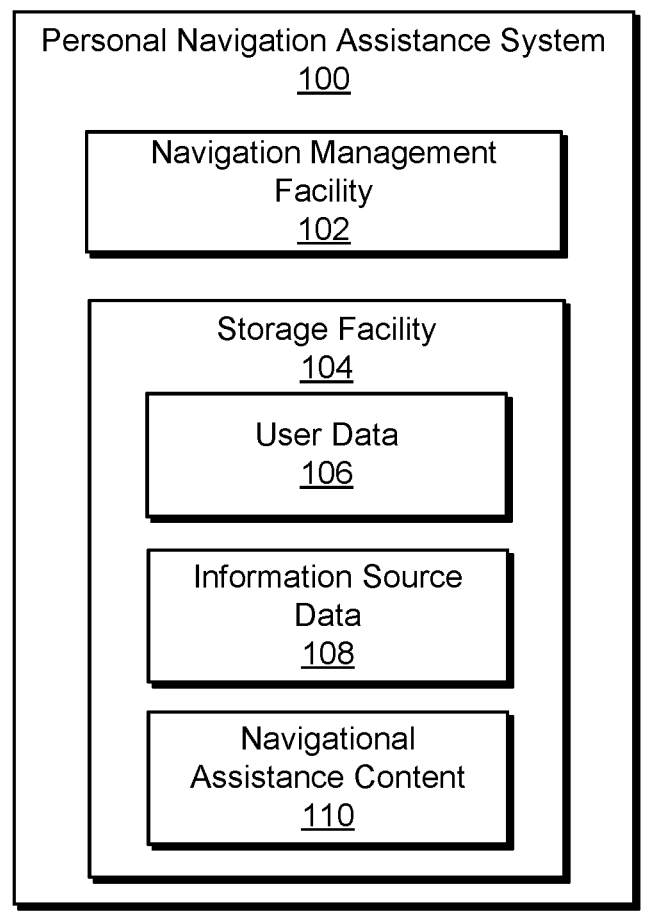
FIG. 1 illustrates an exemplary personal navigation assistance system according to principles described herein.

Exemplary personal navigation assistance systems and methods are described herein. In certain examples, the systems and methods described herein may access data from a plurality of disparate information sources, aggregate the data, and use the aggregated data to generate and provide navigational assistance content to a user of a computing device. In so doing, the systems and methods described herein may help the user optimize a trip to a destination. For example, an exemplary system may detect an upcoming trip of a user to a destination, access data associated with the upcoming trip from a plurality of disparate information sources, aggregate the accessed data associated with the upcoming trip, generate navigational assistance content for the upcoming trip based on the aggregated data, and provide the navigational assistance content for the upcoming trip to a computing device for presentation to the user.

As used herein, "navigational assistance content" refers to any content related to a trip of a user to a destination and that may be provided to the user by way of a computing device to assist the user before, during, and/or after the trip of the user to the destination. For example, navigational assistance content may include, but is not limited to, notifications, alerts, suggestions, indicators, graphical objects (e.g., maps), etc. that may be provided to a user by way of a computing device. In certain examples, the navigational assistance content may include and/or otherwise be associated with (e.g., generated based on) information accessed from a plurality of disparate information sources. Such information accessed from the plurality of disparate information sources may include any information related to a trip of a user. Examples of information sources and the information that they may provide are described herein.

Information accessed from the plurality of disparate information sources may be utilized and/or processed in any of the ways described herein to generate navigation assistance content for a trip of a user. As described herein, in certain examples, the generated navigational assistance content may be associated with real-time parking space availability information indicative of a current state of one or more specific parking spaces (e.g., information indicating an occupied state, an unoccupied state, or another state of each of one or more vehicular parking spaces). Additionally or alternatively, as described herein, the generated navigational assistance content may be personalized to a user based on any suitable information associated with the user. Specific examples of navigational assistance content and how the navigational assistance content may be generated and provided to a user are described herein.

Various benefits may be realized in accordance with the methods and systems described herein. For example, methods and systems described herein may facilitate a user optimizing a trip, such as by the user utilizing navigation assistance content to make the trip quickly, efficiently, and/or in a convenient manner. This, in turn, may benefit municipalities, facilities (e.g., airports, sports venues, etc.), etc. in terms of efficiency, revenue, and improved traffic flow. These and/or additional or alternative benefits and/or advantages that may be provided by systems and methods described herein will be made apparent by the following description. Exemplary personal navigation assistance systems and methods will now be described in reference to the accompanying drawings.

FIG. 1 illustrates an exemplary personal navigation assistance system 100 ("system 100"). System 100 may access data associated with an upcoming trip of a user from a plurality of disparate information sources and utilize such data to generate and provide navigational assistance content configured to help the user optimize the trip. System 100 may be associated with (e.g., operated by) a provider of a navigation service ("service provider") or some other entity.

As shown in FIG. 1, system 100 may include, without limitation, a navigation management facility 102 ("management facility 102") and a storage facility 104 selectively and communicatively coupled to one another. Facilities 102 and 104 may be communicatively coupled one to another by any suitable communication technologies.

It will be recognized that although facilities 102 and 104 are shown to be separate facilities in FIG. 1, facilities 102 and 104 may be combined into a single facility or split into additional facilities as may serve a particular implementation. Additionally or alternatively, one or more of facilities 102 and 104 may be omitted from and external to system 100 in other implementations. For example, storage facility 104 may be external of system 100 in some alternative implementations. Facilities 102 and 104 will now be described in more detail.

Storage facility 104 may store user data 106 (e.g., user profile data) representative of information associated with a user and that may be used to generate and provide navigational assistance content to the user. Storage facility 104 may also store information source data 108 representative of data accessed from disparate information sources and associated with an upcoming trip of the user. Storage facility 104 may also store navigational assistance content 110 representative of content that may be generated and provided by system 100 in any of the ways described herein.

Management facility 102 may perform one or more operations described herein. For example, management facility 102 may access data from a plurality of disparate information sources, aggregate the data, and use the aggregated data to generate and provide navigational assistance content to a user of a computing device (e.g., a mobile phone, a tablet computer, a laptop computer, a desktop computer, a stand-alone navigation device, an in-dash vehicular navigation device, etc.). To illustrate, management facility 102 may detect an upcoming trip of a user to a destination, access data associated with the upcoming trip from the plurality of disparate information sources, aggregate the accessed data associated with the upcoming trip, generate navigational assistance content for the upcoming trip based on the aggregated data, and provide the navigational assistance content for the upcoming trip to a computing device for presentation to the user. Examples of how management facility 102 may perform such operations will now be described.

Management facility 102 may detect an upcoming trip of a user to a destination. Management facility 102 may detect the upcoming trip in any suitable manner. For example, management facility 102 may access and utilize user travel pattern information, user communications (e.g., user emails, text messages, and/or other types of communications), user calendar information, and/or any other suitable information to determine the destination and when the trip may occur. To illustrate, management facility 102 may, with permission of the user, access an email account of the user and determine that the user has a trip planned based on a travel booking confirmation email (e.g., a confirmation email received from a travel agency, a hotel, an airline, or other entity). Additionally or alternatively, management facility 102 may detect the upcoming trip based on information specifically provided to management facility 102 or some other entity by the user. For example, management facility 102 may detect the upcoming trip based on the user requesting, in any suitable manner, directions to a destination (e.g., by entering an address by way of a user interface).

As used herein, "an upcoming trip" (or simply "trip") of a user may correspond to any trip that the user may make to a destination. In certain examples, the upcoming trip may correspond to one segment of an overall trip that includes multiple segments. For example, the upcoming trip may correspond to a first segment in which a user travels from the user's home to an airport as a first leg of an overall trip. In such an example, other trips (i.e., other segments of the overall trip) may be associated with the user flying to an additional airport from the airport during a second segment and the user traveling from the additional airport to an additional location during a third segment. Alternatively, the upcoming trip may include an overall trip such as a round trip where the user travels from a starting location to a destination and then returns from the destination to the starting location. For example, the upcoming trip may include the user traveling from the user's home to a sports venue and then returning from the sports venue to the user's home. Specific examples of trips and how those trips may be associated with navigational assistance content 110 are described herein.

In certain examples, management facility 102 may access data associated with an upcoming trip from a plurality of disparate information sources. Management facility 102 may access the data from the information sources in any suitable manner and through any suitable communication technologies. For example, management facility 102 may, based on the destination and a current location of the user, access data from information sources along one or more possible travel routes of the user and/or from information sources that are associated with and/or that are geographically proximate to the destination. Additionally or alternatively, management facility 102 may access data from any information source capable of providing data that may be used to optimize the upcoming trip.

Figure 2:
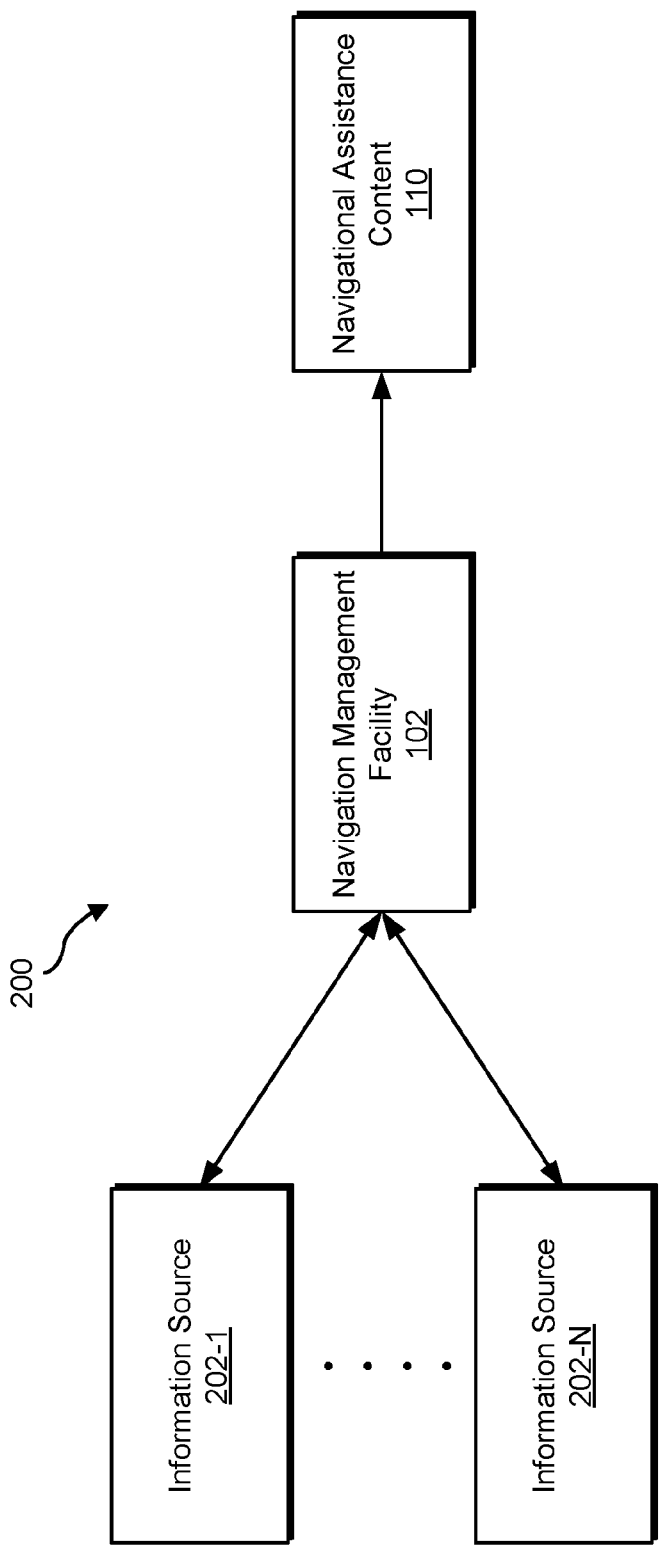
FIG. 2 illustrates an exemplary configuration in which a navigation management facility of the personal navigation assistance system of FIG. 1 accesses data from information sources and generates navigational assistance content according to principles described herein.

FIG. 2 shows an exemplary configuration 200 according to principles described herein. As shown in FIG. 2, management facility 102 is communicatively coupled to a plurality of information sources 202 (e.g., information sources 202-1 through 202-N). Information sources 202 may include any device, service, and/or entity that may provide data associated with the upcoming trip. For example, information sources 202 may include, but are not limited to, traffic status information sources, weather forecast information sources, flight status information sources, surveillance information sources, parking space availability information sources, navigational guidance information sources, vehicle record information sources, geographic (e.g., map) information sources, and/or any other suitable information sources.

Information sources 202 may be disparate sources of information. Information sources 202 may be disparate in one or more ways. For example, information sources 202 may be physically and/or logically separate and independent of one another, may be associated with different entities (e.g., operated or provided by different entities), may be sources of data representing different types of information (e.g., flight status information versus real-time parking space availability information), and/or may be otherwise distinct sources of information.

The data accessed from information sources 202 may include any information that may be associated with a trip of a user, such as traffic status information (e.g., information regarding traffic accidents, traffic congestion, etc.), weather forecast information (e.g., information regarding inclement weather that may occur), flight status information (e.g., information regarding flight delays, cancellations, etc.), surveillance information (e.g., information recorded by cameras, microphones, etc.), parking space availability information (e.g., parking space vacancy information, occupancy information, etc.), navigational guidance information (e.g., step-by-step instructions provided by a provider of a navigation service), alternate route information, goods and/or services information, crowd sourced information, travel time to parking space information, travel (e.g., walking) time from parking space to destination information, parking zone information, vehicle record information, travel station information (e.g., terminal/gate information, security line information, check-in information, etc.), and/or any other information related to the trip of the user. In certain examples, management facility 102 may access data from cloud-based information sources to determine, for example, airport security line wait times, airport departure gates, flight departure times, etc. Additionally or alternatively, the data may include event development information that may include or be indicative of changes in traffic information, parking information, event status information (e.g., scores of a sporting event, performance status, etc.), etc. that may be used by management facility 102 to inform the user regarding the trip. Examples of how management facility 102 may utilize information accessed from information sources 202 are provided herein.

In certain examples, one or more of the information sources 202 may provide data representative of information about vehicular parking spaces associated with a trip (e.g., parking spaces geographically proximate a trip destination), such as real-time parking space availability information, for access by management facility 102. As an example, information sources 202 may include one or more smart parking meters, which may be configured to communicate with and transmit data to management facility 102 using any suitable communication technologies. A smart parking meter may include one or more sensors (e.g., cameras, proximity sensors, etc.) configured to capture field information associated with one or more parking spaces and a transmitter to transmit the information to management facility 102. As another example, information sources 202 may include one or more computing devices (e.g., a server device) that are communicatively coupled to smart parking meters and that receive, from the smart parking meters, and maintain data representative of information about vehicular parking spaces.

In certain examples, information about vehicular parking spaces may include information about attributes of the parking spaces, such as information regarding a size of a parking space, information regarding an orientation of a parking space, an image of a parking space, an image of an area surrounding a parking space, an image of a view from a parking space, information indicating with a parking space is covered or exposed, information regarding proximity of a parking space to nearby geographic features (e.g., a building entrance, a building elevator, etc.), geographic location information of a parking space (e.g., GPS coordinates of a parking space), parking zone information for a parking space, travel options associated with a parking space (e.g., airport shuttle information, bus or subway information, etc.), and any other suitable information about a parking space.

In certain examples, information about attributes of a parking space may include real-time parking space availability information, which may indicate whether a parking space is currently occupied, available, and/or soon-to-be available, a real-time image associated with a parking space, an image of a vehicle currently parked in a parking space, an amount of time remaining on a smart parking meter associated with a parking space, and/or any other information indicating a real-time attribute of a parking space.

Examples of how management facility 102 may utilize data accessed from smart parking meters, including data representing real-time parking space availability information, are provided herein.

In certain examples, management facility 102 may aggregate the data accessed from information sources 202 and associated with an upcoming trip. Management facility 102 may aggregate the data in any suitable manner such that the aggregated data may include a set of aggregate data related to the upcoming trip. For example, management facility 102 may aggregate the data accessed from information sources 202 along or otherwise associated with one or more possible travel routes of the user and/or from information sources 202 associated with a destination of the trip. The data aggregated by management facility 102 may be stored by storage facility 104 as information source data 108.

Based on the aggregated data, management facility 102 may generate navigational assistance content 110 for the upcoming trip. Management facility 102 may generate navigational assistance content 110 in any suitable manner. As shown in the example depicted in FIG. 2, navigational assistance content 110 may be generated and output by management facility 102. As described above, navigational assistance content 110 may include any content that may facilitate a convenient, intuitive, and/or efficient trip of the user. In certain examples, navigational assistance content 110 may include parking assistance content that may be generated based on real-time parking space availability information. The parking assistance content may be configured to guide the user to a most appropriate parking zone and/or parking space based on information accessed from information sources 202. Specific examples of parking assistance content are provided herein.

In certain examples, management facility 102 may personalize navigational assistance content 110 to a user based on information associated with the user. In certain examples, such information associated with the user may comprise user data 106 such as user profile data associated with (e.g., included in) a user profile of the user. The user profile data may include any information regarding the user that may be used to personalize the navigational assistance content 110. For example, the user profile data may include, but is not limited to, settings information, user preference information (e.g., information regarding preferred travel routes), preferred cost information (e.g., information indicating how much the user is willing to spend for parking and/or services), preferred parking style (e.g., parallel, pull in, etc.), preferred parking space size, preferred travel time, etc.), vehicle information (e.g., vehicle size, vehicle make, gas mileage, etc.), parking space preference information (e.g., information about desired cost, proximity, orientation, and/or attributes of a parking space), and/or any other suitable information related to the user. Examples of how management facility 102 may access user profile data to personalize navigational assistance content 110 are provided herein.

In certain examples, management facility 102 may be configured to use system-wide data associated with system 100 to generate navigational assistance content for a user of a navigation assistance service provided by system 100. This may include management facility 102 using real-time information about users of the service to generate navigational assistance content. For example, management facility 102 may determine, from system data, that ten users are traveling to the same destination and that only seven parking spaces are available in an optimal parking zone proximate the destination. Accordingly, management facility 102 may generate navigational assistance content configured to suggest appropriate parking zones/spaces to the ten users (e.g., some of the users may be directed to the optimal parking zone and some of the users may be directed to other parking zones).

Management facility 102 may provide navigational assistance content 110 to a computing device associated with a user in any suitable manner. For example, management facility 102 may provide navigational assistance content 110 to a computing device over any suitable data communications connection(s) (e.g., via a communications network connection) and using any suitable content transmission technologies. The computing device may receive and present the navigational assistance content 110 for experiencing by a user of the computing device. In certain examples, management facility 102 may provide navigational assistance content 110 as text-based content (i.e., content that primarily includes text), image-based content (i.e., content that includes one or more images), video content (i.e., content that include one or more video clips), audio content (e.g., voice navigation instructions), selectable links, interactive content, and/or any other type of content as may serve a particular implementation. In certain examples, management facility 102 may provide navigational assistance content 110 for display on a display screen associated with the computing device for presentation to the user.

In certain examples, management facility 102 may provide navigational assistance content 110 as part of or as a supplement to turn-by-turn instructions (e.g., driving instructions) provided by way of the computing device to guide the user along a travel route to a destination. In certain examples, management facility 102 may provide the turn-by-turn instructions to the computing device. Alternatively, a third-party (e.g., a navigation service provider) may provide the turn-by-turn instructions. Additionally or alternatively, management facility 102 may direct the computing device to provide a map for display on a display screen that shows the user's current position and heading.

Figure 3:
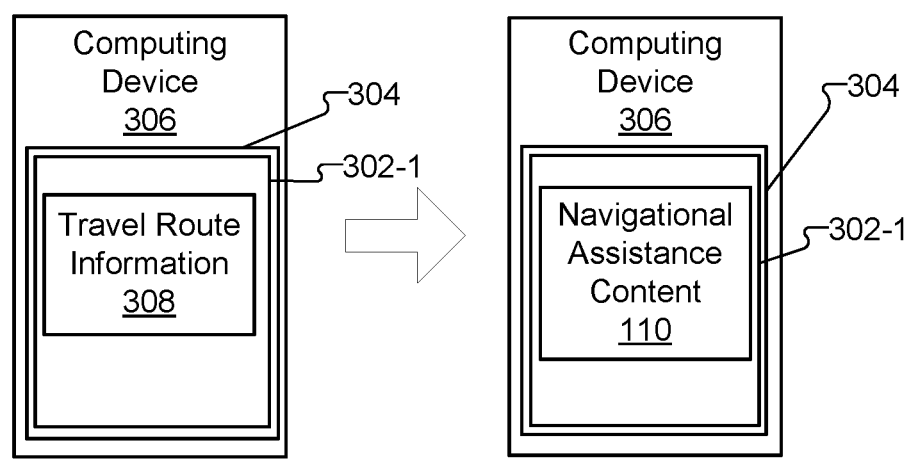
FIGS. 3-6 illustrate exemplary graphical user interface views according to principles described herein.

In certain examples, management facility 102 may provide navigational assistance content 110 in one or more graphical user interface views for display on a display screen associated with the computing device. Management facility 102 may provide the one or more graphical user interface views for display in any suitable manner. To illustrate, FIG. 3 shows a series of graphical user interface views that may be provided for display by management facility 102. As shown in FIG. 3, management facility 102 may provide graphical user interface views 302 ("views") (e.g., views 302-1 through 302-2) for display on a display screen 304 associated with a computing device 306. Computing device 306 may be any computing device, such as described herein. As shown in FIG. 3, management facility 102 may provide travel route information 308 for display in view 302-1. Travel route information 308 may include any information associated with the trip of the user. For example, travel route information 308 may indicate a destination, a travel time, an arrival time, and/or any other information associated with the trip. In certain examples, travel route information 308 may include turn-by-turn instructions to guide the user to the destination. Additionally or alternatively, travel route information 308 may include sequentially-provided images and/or voice navigation instructions to guide the user to the destination.

Based on aggregated data associated with the trip, management facility 102 may also generate and provide navigational assistance content 110 for display in view 302-2. Navigational assistance content 110 may include any content, such as described herein, configured to be used by the user to optimize a trip to a destination. While FIG. 3 illustrates navigational assistance content 110 being provided in a separate view from travel route information 308, it is understood that in certain examples travel route information 308 and navigational assistance content 110 may be provided together, in any suitable manner, in a single view. In certain examples, management facility 102 may provide travel route information 308 and navigational assistance content 110 for display on a display screen associated with the same computing device (e.g., both may be provided for display on a display screen of a smartphone or both may be provided for display on a display screen of a stationary computing device (e.g., a desktop computer)). Alternatively, in certain examples, travel route information 308 and navigational assistance content 110 may be provided for display on display screens associated with different computing devices. For example, prior to the trip, management facility 102 may provide travel route information 308 for presentation to the user by way of a desktop computer. However, during the trip, management facility 102 may provide navigational assistance content 110 for presentation to the user by way of any suitable mobile computing device.

In certain examples, data accessed by management facility 102 from one or more information sources (e.g., information sources 202) may dynamically change during the trip (e.g., while the user is traveling to a destination associated with the trip). For example, traffic patterns, parking space availability, airport departure gates, etc. may change during the trip. In certain examples, management facility 102 may detect, in any suitable manner, a change in the information accessed from the one or more information sources. Based on the detected change, management facility 102 may update the navigational assistance content (e.g., navigational assistance content 110) and provide the updated navigational assistance content to a mobile computing device for presentation to the user during the trip. For example, management facility 102 may detect a change in real-time parking space availability information during the trip. Based on the change in the real-time parking space availability information, management facility 102 may update the navigational assistance content and provide the updated navigational assistance content to the mobile computing device for presentation to the user. To illustrate, management facility 102 may provide navigational assistance content to a computing device suggesting that the user park in a particular parking space during the drip. However, prior to the user parking in the suggested parking space, another vehicle may be parked in that space. Management facility 102 may detect (e.g., by accessing data from a smart parking meter) that the suggested parking space has been occupied and provide updated navigational assistance content to the computing device suggesting that the user park in a different parking space.

Management facility 102 may time the providing of updated navigational assistance content with one or more decisions points along a travel route of the trip. For example, management facility 102 may determine a juncture along the travel route at which the user will decide whether to turn one direction to travel to a particular parking zone or to turn another direction to travel to a different parking zone. At a suitable time prior to the user reaching the juncture along the travel route, management facility 102 may use a snapshot of aggregated data collected from information sources to generate and provide the navigational assistance content to a computing device of the user such that the user is presented with up-to-date navigational assistance content that will allow the user sufficient time to receive and use the navigational assistance content to decide which way to turn at the juncture.

Exemplary operations of management facility 102 will now be described in relation to a particular example. In the example, management facility 102 may detect, in any suitable manner, that a user has an upcoming trip to an airport. For example, management facility 102 may access a calendar maintained by the user indicating that the user has a flight scheduled on a particular day. Based on the calendar information, management facility 102 may access data associated with the upcoming trip from a plurality of disparate information sources (e.g., information sources 202). The accessing of data from the information sources may include management facility 102 accessing data from an airport information source, which data may indicate that the user's flight is scheduled to depart from Terminal A and that the flight is on time. The accessing of data from the information sources may also include management facility 102 accessing crowd sourced data, in any suitable manner, indicative of a wait time for each of a plurality airport security lines. For example, management facility 102 may predict the wait time for each of the plurality of airport security lines based on signals from mobile computing devices that are located in each of the plurality of airport security lines. For example, management facility 102 may predict the wait time based on the number of signals from the mobile computing devices. Management facility 102 may aggregate the flight status information and the wait time information and generate navigational assistance content based on the aggregated information. Management facility 102 may provide the navigational assistance content, in any suitable manner, such as described herein, to facilitate the user accessing Terminal A by way of a security line that has a shortest wait time.

Figure 4A:
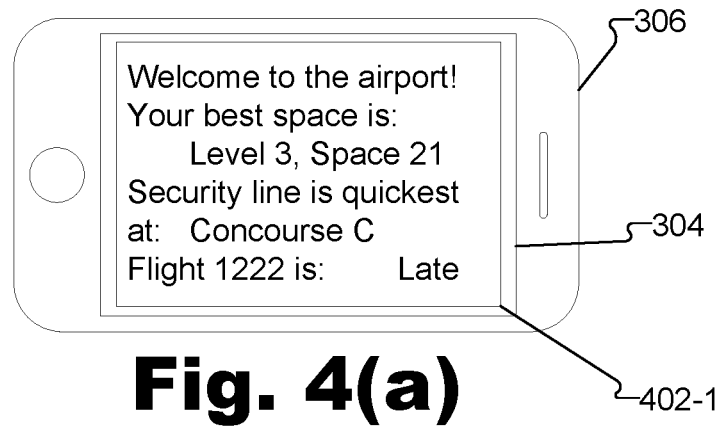
Figure 4B:
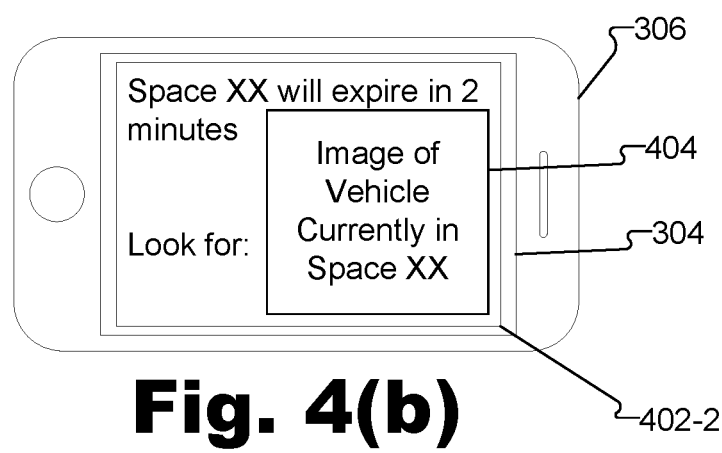
Figure 4C:
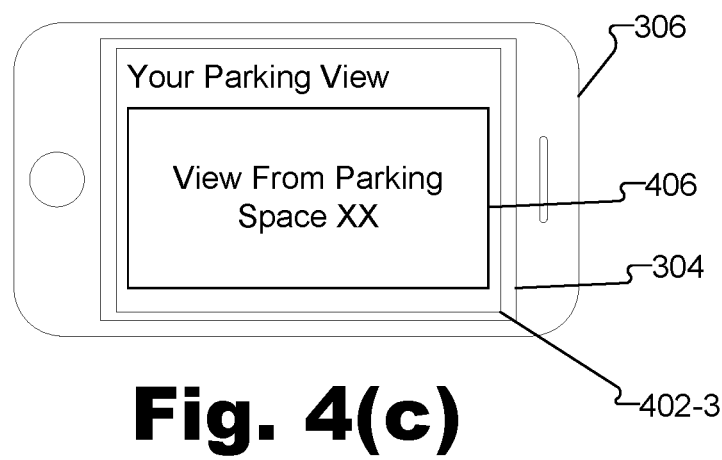

To illustrate, FIG. 4(a) through 4(c) depict exemplary graphical user interface views showing navigational assistance content that includes parking assistance content that may be provided for display by management facility 102 when the user has, for example, an upcoming trip to the airport. As shown in FIG. 4(a) through 4(c), in certain examples, management facility 102 may provide graphical user interface views 402 ("views") (e.g., views 402-1 through 402-3) for display on computing device 306. Management facility 102 may provide any one or all of views 402 for display (e.g., sequentially) on computing device 306 prior to and/or during the trip.

In the example shown in FIG. 4(a), view 402-1 provides navigational assistance content that may be generated by management facility 102 based on data accessed from a plurality of disparate information sources. For example, view 402-1 includes a notification "Welcome to the airport!," which may be generated based on management facility 102 tracking, in any suitable manner, a current location of the user and determining that the user has entered a geographic area associated with the airport. In addition, view 402-1 includes an indication that "Your best space is: Level 3, Space 21," which information may be generated based on management facility 102 accessing, for example, data from any suitable parking space availability information source and/or user profile information. View 402-1 also includes an indication that "Security line is quickest at: Concourse C," which information may be generated based on management facility 102 accessing, for example, an information source that provides crowd sourced information. View 402-1 also includes an indication that "Flight 1222 is: Late," which information may be generated based on management facility 102 accessing data from any suitable airport flight status information source. Accordingly, through view 402-1 the user may be apprised of a combination of different information about the trip that may facilitate the user parking in a suggested space/zone, navigating the airport (e.g., to concourse C to go through the security line), and ultimately boarding the plane in a convenient and timely manner.

In the example shown in FIG. 4(b), view 402-2 provides navigational assistance content that may be additionally or alternatively provided for display by management facility 102 to facilitate the user finding an available parking space. In particular, view 402-2 includes an indication that "Space XX will expire in 2 minutes," which information may be generated by management facility 102 based on data accessed from any suitable parking space availability information source. The indication may represent that a time limit for a vehicle currently parked in space XX is scheduled to expire in two minutes. To further facilitate the user finding space XX, view 402-2 may also include an image 404 of the vehicle currently parked in space XX. In certain examples, image 404 may be an actual real-time image of the vehicle currently parked in space XX. Accordingly, through view 402-2 the user may be able to readily determine that parking space XX is scheduled to come available soon and conveniently locate parking space XX based on image 404.

In the example shown in FIG. 4(c), view 402-3 provides further navigational assistance content that may be additionally or alternatively provided to facilitate the user finding an available parking space. As shown in FIG. 4(c), view 402-3 includes an image 406 representing a view from space XX. Through view 402-3, the user may be able to more easily identify space XX and determine whether space XX is acceptable.

As described above, any of the navigational assistance content provided for display, for example, in views 402 may change during the trip. Accordingly, in certain examples, management facility 102 may dynamically update the navigational assistance content provided for display in views 402 during the trip. To illustrate, while the user is traveling to the airport, a certain number of people may enter the security line at Concourse C such that the security line at Concourse A is now the quickest security line. Management facility 102 may access information from any suitable information source and determine that a change has occurred in the security line information. Accordingly, during the trip, management facility 102 may update the navigational assistance content in view 402-1 to include an indication that "Security line is quickest at: Concourse A." In addition, management facility 102 may update the navigational assistance content during the trip to suggest a different parking space than "Level 3, Space 21" to facilitate the user more conveniently accessing Concourse A instead of Concourse C.

Views 402 shown in FIG. 4(a) through 4(c) are provided for display on a mobile computing device (e.g., a smartphone). However, it is understood that views 402 may be provided for display on any computing device, such as described herein. In addition, views 402 shown in FIG. 4(a) through 4(c) are provided for illustrative purposes only. Other views may be provided for display by management facility 102 as may suit a particular implementation.

Exemplary operations of management facility 102 will now be described in relation to another particular example. In the example, management facility 102 may detect, in any suitable manner, that a user will be attending a professional sporting event. For example, management facility 102 may access an email account associated with the user and determine that the user will be traveling to a sports venue based on a ticket purchase confirmation email. Based on the upcoming trip to the sports venue, management facility 102 may access data associated with the upcoming trip from a plurality of disparate information sources (e.g., information sources 202). The accessing of data from the information sources may include management facility 102 accessing data from any suitable sporting event information source. From the accessed data, management facility 102 may determine that a particular entrance gate is more convenient for accessing the seats associated with the user's tickets. The accessing of data from the information sources may also include management facility 102 accessing parking space availability information from one or more information sources (e.g., smart parking meters). From this information, management facility 102 may determine a parking zone and/or parking space geographically proximate to the entrance gate and where the user is more likely to find parking compared to other parking zones and/or spaces. Management facility 102 may aggregate the entrance gate information and the parking space availability information and generate navigational assistance content, which may be provided to the user in any suitable manner, such as described herein. The navigational assistance content may suggest, in any suitable manner, that the user park in a particular parking zone or parking space so that the user may access the most convenient entrance gate into the venue. In certain examples, management facility 102 may provide the navigational assistance content associated with the user's trip to the venue for display in a manner similar to that illustrated in FIG. 4(a) through 4(c).

Additionally or alternatively, management facility 102 may provide, for display on a display screen of the computing device, a user interface view that facilitates the user pre-ordering goods and/or services before arriving at a destination. Referring to the professional sporting event example above, management facility 102 may provide, for display, a user interface view that facilitates the user pre-ordering and/or pre-paying for concessions (e.g., beverages, food, etc.) from a concessions stand that is geographically proximate to the user's seats within the sports venue. Accordingly, the user may be able to pre-order the concessions, pay for the concessions, pick up the concessions, and proceed conveniently to the user's seats without having to wait in line at the concessions stand.

In certain examples, management facility 102 may provide, for display, a graphical user interface view configured to help a user determine whether there are any geographically proximate parking spaces that may become available within a predetermined amount of time. For example, management facility 102 may provide, for display, a graphical user interface view including a near expiry map for display on the display screen associated with the computing device. As used herein, a "near expiry map" refers to a geographic depiction of a layout of a plurality of parking spaces that includes information regarding the availability of one or more of the plurality of parking spaces. For example, the near expiry map may depict a geographic layout of the plurality of parking spaces and one or more indicators showing a remaining amount of time on parking meters associated with one or more parking spaces included in the plurality of parking spaces. Management facility 102 may provide the graphical user interface including the near expiry map for display in any suitable manner.

Figure 5:
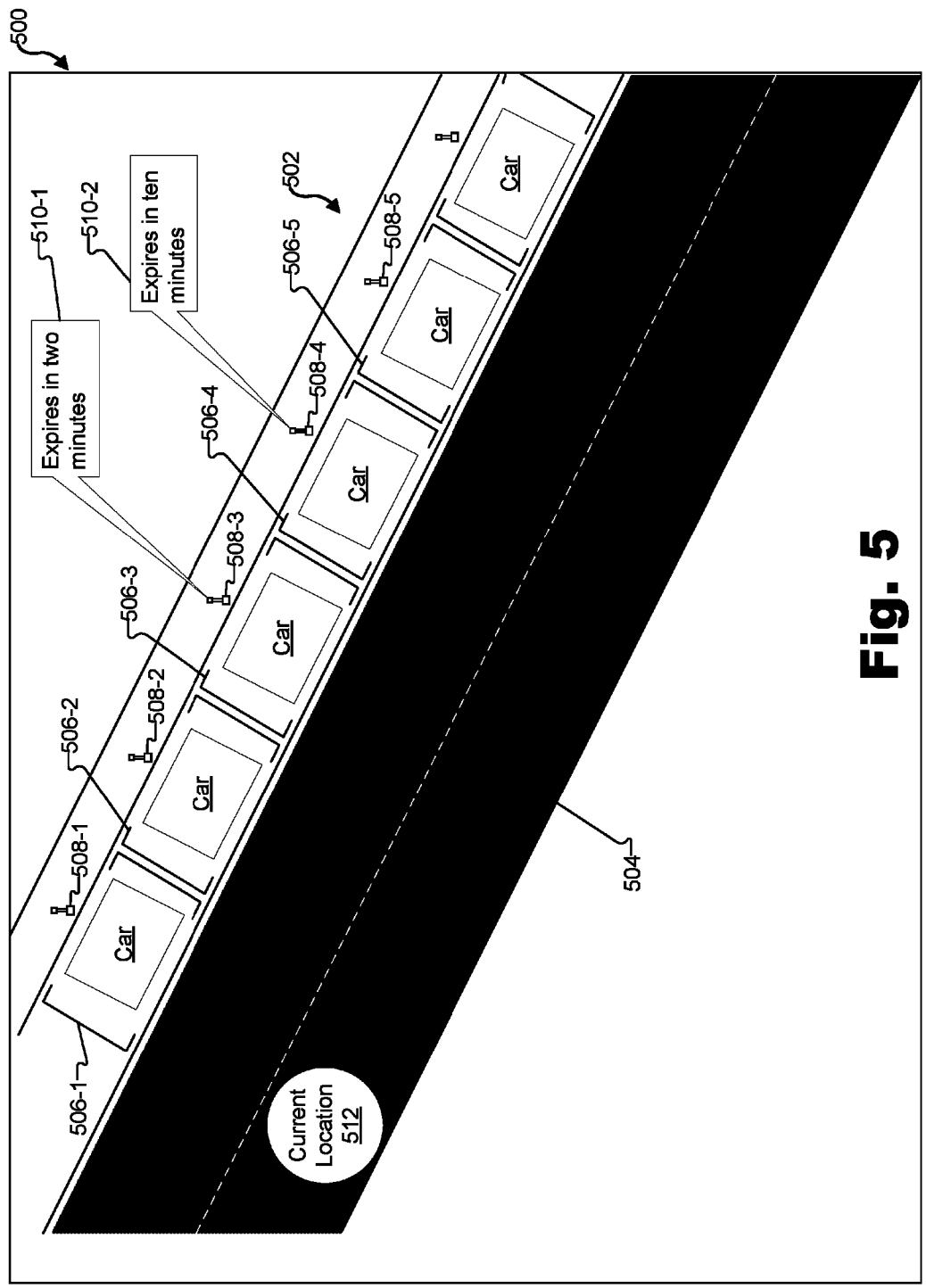

To illustrate, FIG. 5 shows an exemplary graphical user interface view 500 including a near expiry map 502. As shown in FIG. 5, the near expiry map 502 may include a representation of a street 504 and parking spaces 506 (e.g., parking spaces 506-1 through 506-5) adjacent to street 504. FIG. 5 also illustrates parking meters 508 (e.g., parking meters 508-1 through 508-5), which may be smart parking meters, that are provided for parking spaces 506. As further shown in FIG. 5, near expiry map 502 may include indicators 510 (e.g., indicators 510-1 and 510-2) that provide information regarding an amount of time until a corresponding parking meter 508 will expire. In the example shown in FIG. 5, indicator 510-1 indicates that a time associated with parking meter 508-3 will expire in two minutes. Indicator 510-2 indicates that a time associated with parking meter 508-4 will expire in ten minutes. The user may refer to near expiry map 502 and readily determine that parking spaces 508-3 and 508-4 are likely to become available in the near future.

In certain examples, near expiry map 502 may also include a current location indicator 512 that represents a current location of the user. Current location indicator 512 may allow the user to easily determine where the user is in relation to parking spaces 508 and to navigate to, for example, parking space 508-3 and parking space 508-4 that are scheduled to become available soon.

The exemplary near expiry map 502 illustrated in FIG. 5 is provided for illustrative purposes only. Other near expiry maps may be provided for display by management facility 102 in other implementations. In addition, in the example shown in FIG. 5, a parking meter 508 is provided for each parking space 506. However, it is understood that in certain embodiments one parking meter may be provided for a plurality of parking spaces.

In certain examples, management facility 102 may aggregate data that is associated with an upcoming trip and that includes information regarding a plurality of parking zones that are geographically proximate to one another and/or to a destination associated with the upcoming trip. Based on such information, management facility 102 may identify a parking zone included in the plurality of parking zones where the user is more likely to find an available parking space compared to one or more other parking zones. Management facility 102 may identify the parking zone in any suitable manner. For example, management facility 102 may access user preference information, vehicle information, parking space availability information, etc. from disparate information sources and aggregate and utilize the accessed information to identify the parking zone. Management facility 102 may then generate and provide navigational assistance content for display to the user that includes a parking suggestion based on the identified parking zone.

Figure 6:
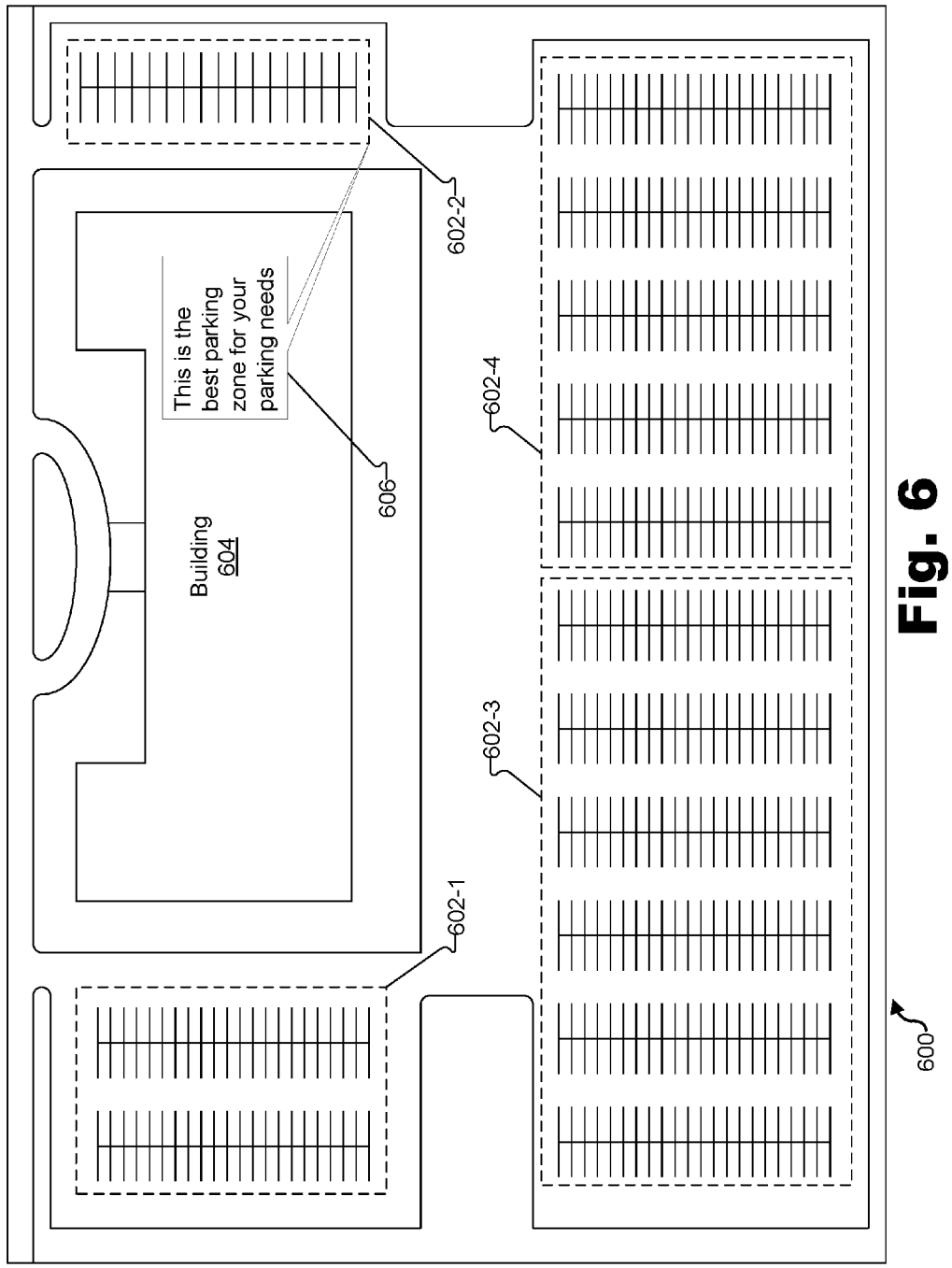

To illustrate, FIG. 6 shows an exemplary graphical user interface view 600 that management facility 102 may provide for display on a display screen associated with a computing device. As shown in FIG. 6, parking zones 602 (e.g., parking zones 602-1 through 602-4) may be located within a geographic proximity of a building 604. Management facility 102 may detect, in any suitable manner, that the user has an upcoming trip to building 604. In addition, management facility 102 may access user data 106 indicating that the user drives a large sport utility vehicle. Management facility 102 may also access parking space availability information indicative of current parking conditions and/or parking space attribute information associated with parking zones 602 from any suitable information source. Based on, for example, the user driving a large sport utility vehicle and there being relatively larger parking spaces in parking zone 602-2, management facility 102 may determine that the user is more likely to find a suitable parking space in parking zone 602-2 than in other parking zones 602-1, 602-3, and 602-4. Accordingly, management facility 102 may provide navigational assistance content, in any suitable manner, suggesting that the user park in parking zone 602-2 during the trip. In the example shown in FIG. 6, the navigational assistance content includes an indicator 606 suggesting that the user park in parking zone 602-2 based on the user's specific parking needs.

The particular surface parking arrangement illustrated in FIG. 6 is provided for illustrative purposes only. It is understood that other parking zones may be defined for other parking arrangements as may suit other implementations.

For example, other parking arrangements may include surface parking as well as a multi-level parking structure where each level in the multi-level parking structure may correspond to a different parking zone. Alternatively, a particular level in the multi-level parking structure may include a plurality of parking zones.

In certain examples, a user may, based on navigational assistance content provided by management facility 102, park the user's vehicle in a parking space and exit the vehicle. After a predetermined amount of time, the user may want to return to the vehicle parked in the parking space. However, the user may not remember where the vehicle is parked. Accordingly, in certain examples, the user may want assistance in returning to a parked vehicle after and/or during a trip. To this end, in certain examples, management facility 102 may detect, based on the aggregated data, that a vehicle associated with the user is parked in a parking space during a trip. Management facility 102 may detect that the vehicle is parked in the parking space in any suitable manner. For example, management facility 102 may detect that the vehicle has parked in a parking space by sensing when the vehicle has been substantially motionless for a predetermined amount of time. Additionally or alternatively, management facility 102 may access data from an information source (e.g., a smart parking meter, a camera in a parking facility, a GPS information source, etc.) and use the data to determine that the vehicle is parked in the parking space.

After management facility 102 determines that the vehicle has parked, management facility 102 may record a geographic location of the parking space in any suitable manner. For example, management facility 102 may access and store GPS information in storage facility 104. After the trip, management facility 102 may facilitate the user returning to the parking space by providing parking space return information to a computing device associated with the user. For example, management facility 102 may provide turn-by-turn (e.g., walking) instructions, in any suitable manner, to a mobile computing device of the user to facilitate the user returning to the parking space.

Additionally or alternatively, management facility 102 may provide information to the computing device regarding one or more services that are available to be performed with respect to the vehicle while the vehicle is parked in the parking space during the trip. Management facility 102 may provide the information to the computing device in any suitable manner. For example, management facility 102 may provide notifications, alerts, and/or advertisements for display on a display screen associated with the computing device. The services may include any service that may be provided to the vehicle while parked in the parking space. Such services may include, but are not limited to, services associated with vehicle repairs, vehicle maintenance, vehicle detailing (e.g., cleaning, washing, etc.), and/or any other suitable service. To illustrate an example, after management facility 102 detects that the user parks the vehicle in the parking space, management facility 102 may access data from an information source (e.g., a vehicle record information source) indicating that the vehicle is due for an oil change. Accordingly, management facility 102 may provide a notification for display on a display screen of a computing device associated with the user asking whether the user would like to have the oil changed while the vehicle is in the parking space. The user may then either accept or decline the oil change, in any suitable manner. In another example, management facility 102 may access data provided by an information source (e.g., a camera) within view of the vehicle and determine that there is a rock chip on the windshield of the vehicle. Accordingly, management facility 102 may provide a notification for display on a display screen of a computing device associated with the user asking whether the user would like to have the rock chip repaired while the vehicle is in the parking space. The user may then either accept or decline the rock chip repair service, in any suitable manner.

During the trip, certain weather conditions may make it undesirable for the user to park in a specific location. Such weather conditions may include hail, snow, sleet, high temperatures, low temperatures, rain, and/or any other type of inclement weather condition. To help the user avoid parking in a parking space that may subject the vehicle to such weather conditions, in certain examples, management facility 102 may access data from an information source that includes weather forecast information. Management facility 102 may access the weather forecast information in any suitable manner. For example, management facility 102 may access the weather forecast information from the National Weather Service, a news outlet, and/or any other suitable entity. Based on the weather forecast information, management facility 102 may, in generating the navigational assistance content, predict how the weather indicated by the weather forecast information may affect at least some parking spaces included in a plurality of parking spaces where the user may park. Management facility 102 may then provide a parking suggestion based at least in part on the weather forecast information. Management facility 102 may provide the parking suggestion in any suitable manner. For example, management facility 102 may determine that the user has an upcoming trip to an airport. Management facility 102 may access weather forecast information and predict that it is likely that a hail storm will occur during a time period associated with the vehicle being parked at the airport. Accordingly, management facility 102 may provide a notification to the user, in any suitable manner, suggesting that the user park in a covered parking area at the airport instead of an open parking area to avoid damage that may be potentially caused by the forecasted hail.

In certain examples, management facility 102 may facilitate a user paying for goods and/or services associated with the trip. For example, management facility 102 may facilitate the user providing payment for parking tolls, services performed on the vehicle while parked, etc. Management facility 102 may facilitate the payment in any suitable manner. To illustrate an example, management facility 102 may detect a time when the vehicle associated with the user parks in a parking space and a time when the vehicle leaves the parking space. Based on the detected times, management facility 102 may automatically determine a charge associated with parking in the parking space and notify the user of the charge in any suitable manner. In certain examples, the charge associated with parking in the parking space may be automatically debited from or charged to an account associated with the user. In this regard, it may be possible for the user to simply drive away from the parking space without having to worry about manually paying, for example, a parking attendant or a parking meter.

Figure 7:
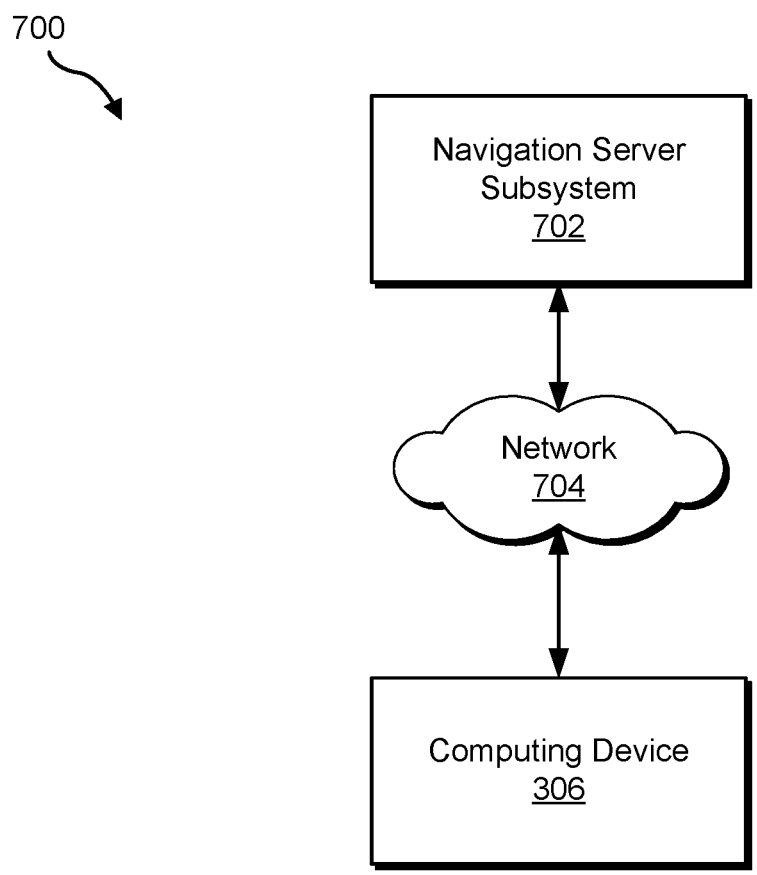
FIG. 7 illustrates an exemplary implementation of the system of FIG. 1 according to principles described herein.

FIG. 7 illustrates an exemplary implementation 700 of system 100 wherein a navigation server subsystem 702 ("server subsystem") is communicatively coupled to computing device 306 by way of a network 704. Management facility 102 and storage facility 104 may each be implemented by server subsystem 702 and/or computing device 306. Accordingly, in certain embodiments, components of system 100 may be implemented entirely by server subsystem 702 or computing device 306. In other embodiments, components of system 100 may be distributed across server subsystem 702 and computing device 306.

Server subsystem 702 may be associated with a service provider (e.g., a mobile communications service provider, a personal navigation service provider, etc. that may provide a destination-based personal navigation service. Accordingly, server subsystem 702 may be configured to provide navigational assistance content to computing device 306. For example, server subsystem 702 may be configured to manage (e.g., maintain, process, distribute, and/or generate) navigational assistance content configured to be delivered to computing device 306. Server subsystem 702 may be implemented by one or more computing devices as may serve a particular implementation.

Additionally or alternatively, server subsystem 702 may be implemented by one or more third-party servers configured to access, manage, and/or maintain data associated with navigation, interface with one or more social media service provider subsystems, and/or perform any other operation associated with the methods and systems described herein.

Computing device 306 may facilitate access by a user to content (e.g., navigational assistance content) provided by server subsystem 702. For example, computing device 306 may be configured to present navigational assistance content associated with a trip of the user. Computing device 306 may include one or more user computing devices associated with a user, including any of the exemplary computing devices disclosed herein.

Server subsystem 702 and computing device 306 may communicate using any communication platforms and technologies suitable for transporting data (e.g., data associated with navigational assistance content, data associated with services, etc.) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), SIP, SCCP, XMPP, Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Long Term Evolution ("LTE") technologies, Multimedia Message Service ("MMS"), radio frequency ("RF") signaling technologies, wireless communication technologies, Internet communication technologies, digital content streaming technologies, digital content download technologies, and other suitable communications technologies.

In certain embodiments, server subsystem 702 and computing device 306 may communicate via a network 704. Network 704 may include one or more networks, such as one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data and/or communications signals between server subsystem 702 and computing device 306. Communications between server subsystem 702 and computing device 306 may be transported using any one of the above-listed networks, or any combination or sub-combination of the above-listed networks. Alternatively, server subsystem 702 and computing device 306 may communicate in another way such as by direct connections between server subsystem 702 and computing device 306.

Figure 8:
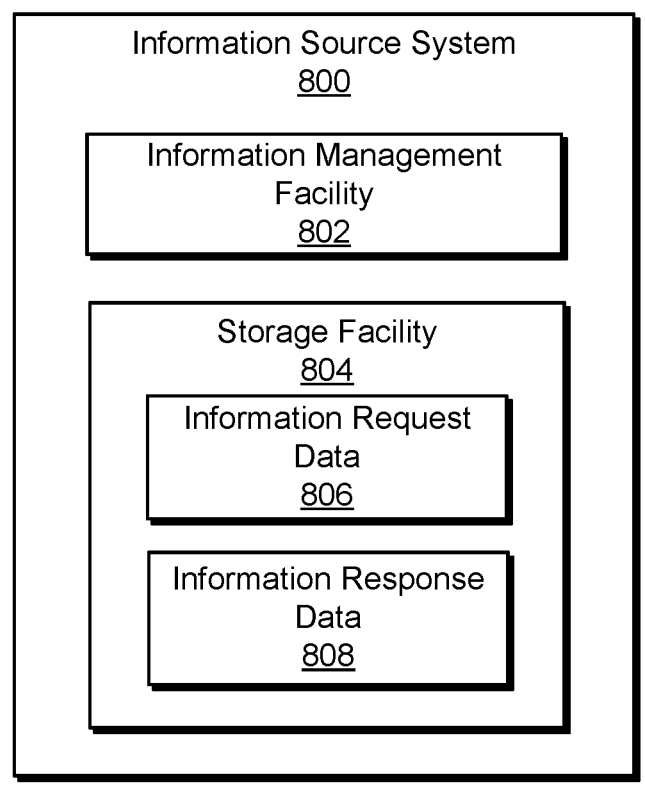
FIG. 8 illustrates an exemplary information source system according to principles described herein.

In certain examples, an information source system associated with an information source may provide an interface (e.g., an application program interface, web services interface, etc.) through which one or more other entities (e.g., management facility 102, system 100, a navigation service provider, etc.) may access data from the information source. For example, FIG. 8 illustrates an exemplary information source system 800 ("system 800"). System 800 may be configured to access and provide data that is requested by another entity and that is associated with an upcoming trip of a user. For example, system 800 may be configured to access and provide such data to be used by any suitable entity in providing navigational assistance content to a user. System 800 may be associated with (e.g., operated by) a particular information source or some other entity (e.g., a third party).

As shown in FIG. 8, system 800 may include, without limitation, an information management facility 802 and a storage facility 804 selectively and communicatively coupled to one another. Facilities 802 and 804 may be communicatively coupled one to another by any suitable communication technologies, such as described herein.

It will be recognized that although facilities 802 and 804 are shown to be separate facilities in FIG. 8, the facilities 802 and 804 may be combined into a single facility or split into additional facilities as may serve a particular implementation. Additionally or alternatively, one or more of the facilities 802 and 804 may be omitted from and external to system 800 in other implementations. For example, storage facility 804 may be external of system 800 in some alternative implementations. Facilities 802 and 804 will now be described in more detail.

Storage facility 804 may be configured to store information request data 806 representative of any request information provided by a requesting entity that may be used in accessing information from an information source associated with system 800. For example, information request data 806 may specify a plurality of parameters that define the information requested by the requesting entity. Storage facility 804 may also store information response data 808 representative any information accessed from the information source associated with system 800 based on information request data 806.

Information management facility 802 may be configured to perform one or more operations described herein to provide an interface through which system 100 may access information from one or more information sources. Examples of such operations are described below.

In certain examples, information management facility 802 may receive a request from a requesting entity for information associated with an upcoming trip of a user. Information management facility 802 may receive the request in any suitable manner and though any suitable communication technologies. The request may specify a plurality of parameters associated with the requested information. The parameters may specify, for example, what information is desired, where the information may be located, and what time to access the information. In certain examples, the parameters may include, for example, specific location and/or geographic area parameters, preferred parking configuration parameters, parking cost parameters, parking time parameters, geographic proximity parameters, etc.

Based on the parameters specified in the request, information management facility 802 may access data from the information source(s) associated with system 800. Information management facility 802 may access the data through any suitable communications technologies.

After information management facility 802 accesses the requested data, information management facility 802 may provide the accessed data to the requesting party in any suitable manner and through any suitable communications technologies.

To illustrate an example, a navigation service provider may be in the process of providing instructions to a user to guide the user on a trip to a specific building. During the trip, information management facility 802 may receive a request for real-time parking space availability information from the navigation service provider. The request may query whether there are any parking spaces that are within five hundred feet of the specific building and that will become available (e.g., a parking meter associated with the parking spaces will expire) within the next fifteen minutes. The request may also ask for image information (e.g., via a camera associated with a parking meter) associated with the parking spaces within the defined area.

In response to the request, information management facility 802 may access information, for example, from parking meters that are within five hundred feet of the building and determine that there are four parking meters that will expire within the next fifteen minutes. Information management facility 802 may then access, for example, a camera associated with the parking meters to generate a real-time image of the vehicle parked in each of the four parking spaces associated with the parking meters.

Information management facility 802 may then provide the information regarding the four parking spaces to the navigation service provider in any suitable manner. The navigation service provider may utilize the information provided by information management facility 802 to generate and provide navigational assistance content configured to facilitate the user finding and potentially parking in one of the four parking spaces during the trip in any suitable manner, such as described herein.

Figure 9:
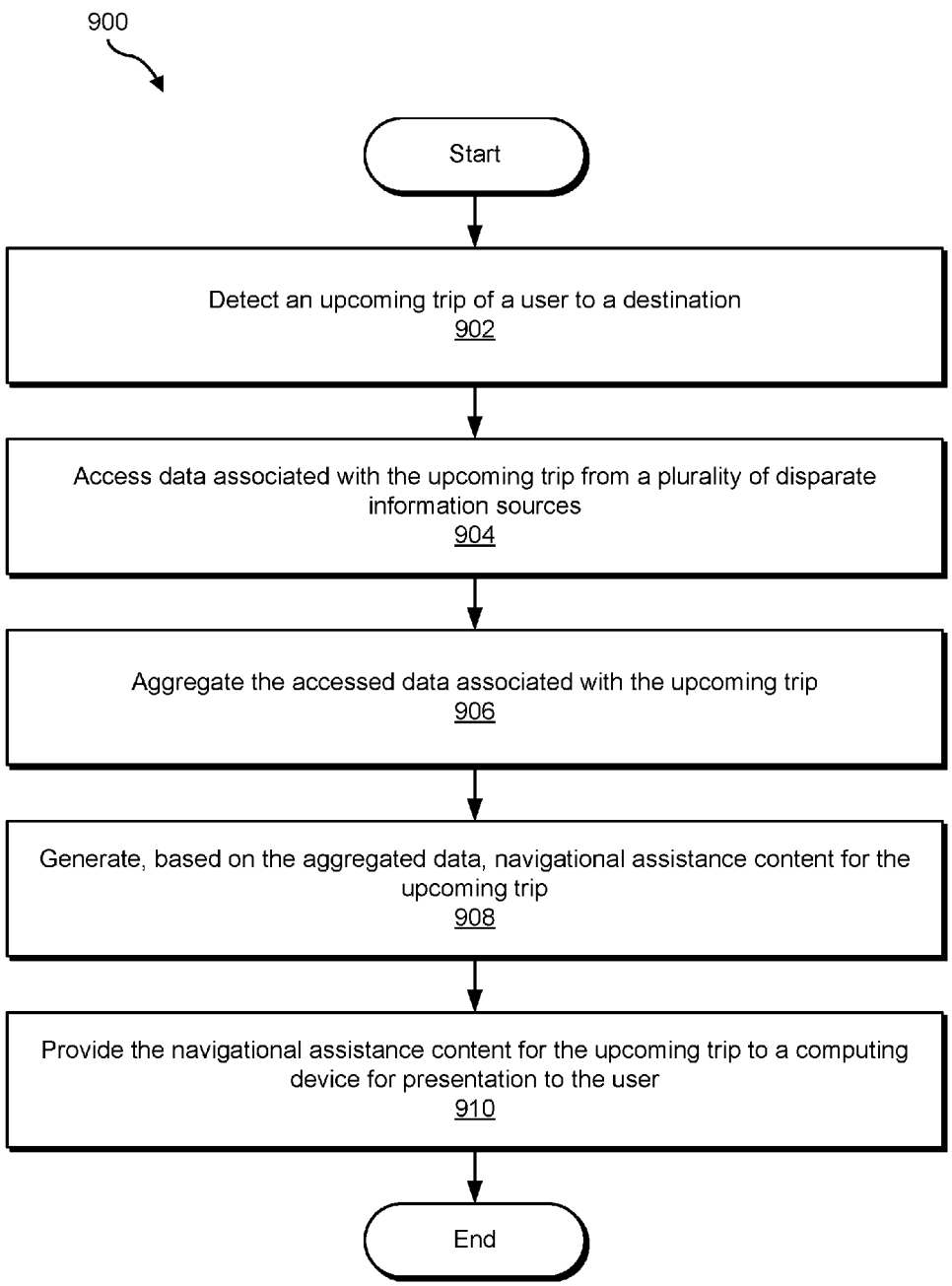
FIGS. 9-10 illustrate exemplary personal navigation assistance methods according to principles described herein.
Figure 10:
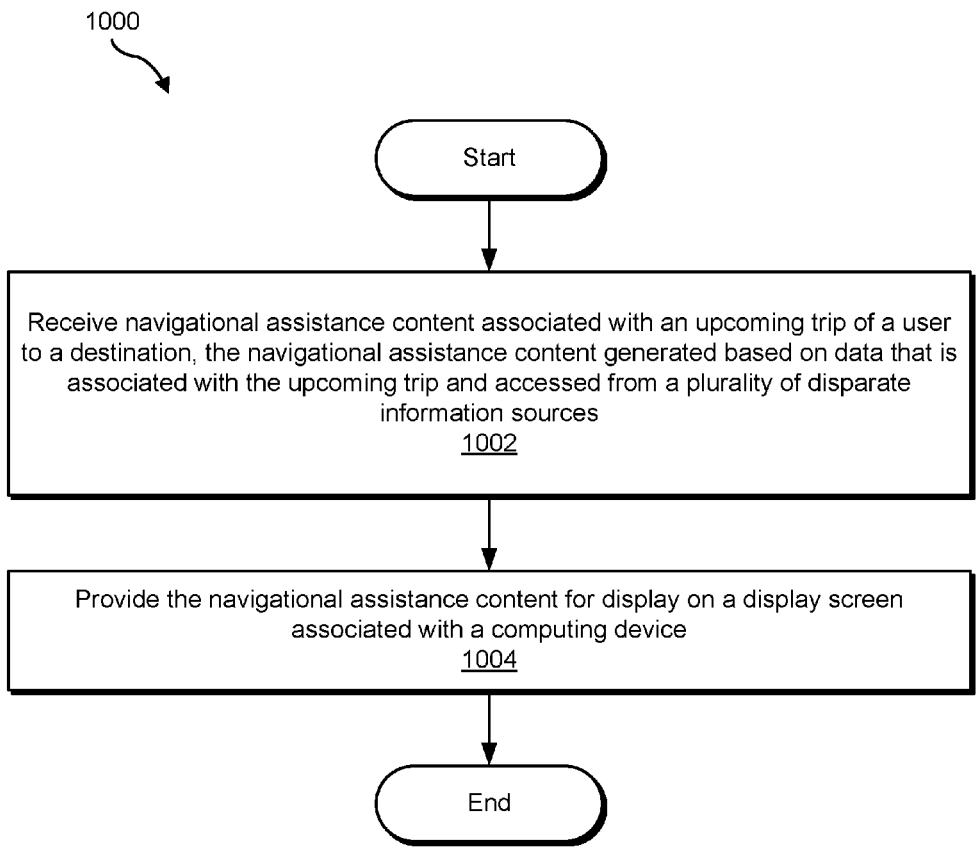

FIGS. 9-10 illustrate exemplary personal navigation assistance methods 900-1000 according to principles described herein. While FIGS. 9-10 illustrate exemplary steps according to certain embodiments, other embodiments may omit, add to, reorder, combine, and/or modify any of the steps shown in FIGS. 9-10. In certain embodiments, one or more of the steps shown in FIGS. 9-10 may be performed by system 100 and/or one or more components or implementations of system 100.

Turning to method 900 illustrated in FIG. 9, in step 902, a system (e.g., system 100) detects an upcoming trip of a user to a destination. Step 902 may be performed in any of the ways described herein.

In step 904, the system accesses data associated with the upcoming trip from a plurality of disparate information sources. Step 904 may be performed in any of the ways described herein.

In step 906, the system aggregates the accessed data associated with the upcoming trip. In certain examples, the aggregated data may include real-time parking space availability information. Step 906 may be performed in any of the ways described herein.

In step 908, the system generates, based on the aggregated data, navigational assistance content for the upcoming trip. In certain examples, the navigational assistance content may include parking assistance content generated based on the real-time parking space availability information. Step 908 may be performed in any of the ways described herein.

In step 910, the system provides the navigational assistance content for the upcoming trip to a computing device for presentation to the user. Step 910 may be performed in any of the ways described herein.

Turning to method 1000 illustrated in FIG. 10, in step 1002, a computing device (e.g., computing device 306) receives navigational assistance content associated with an upcoming trip of a user to a destination. In certain examples, the navigational assistance content may be generated based on data that is associated with the upcoming trip and accessed from a plurality of disparate information sources. In certain examples, the navigational assistance content includes parking assistance content generated based on real-time parking space availability information. Step 1002 may be performed in any of the ways described herein.

In step 1004, the computing device provides the navigational assistance content for display on a display screen associated with the computing device. Step 1004 may be performed in any of the ways described herein.

In certain embodiments, one or more of the components and/or processes described herein may be implemented and/or performed by one or more appropriately configured computing devices. To this end, one or more of the systems and/or components described above may include or be implemented as one or more computing systems and/or components by any computer hardware, computer-implemented instructions (e.g., software) embodied in a non-transitory computer-readable medium, or combinations of computer-implemented instructions and hardware, configured to execute one or more of the processes described herein. In particular, system components may be implemented on one physical computing device or may be implemented on more than one physical computing device. Accordingly, system components may include any number of physical computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a floppy disk, flexible disk, hard disk, magnetic tape, any other magnetic medium, a Compact Disc Read-Only Memory (CD-ROM), DVD, any other optical medium, a Random-Access Memory (RAM), a Programmable ROM (PROM), an Erasable PROM (EPROM), a Flash Electrically EPROM (FLASH-EEPROM), any other memory chip or cartridge, or any other tangible medium from which a computer may read.

Figure 11:
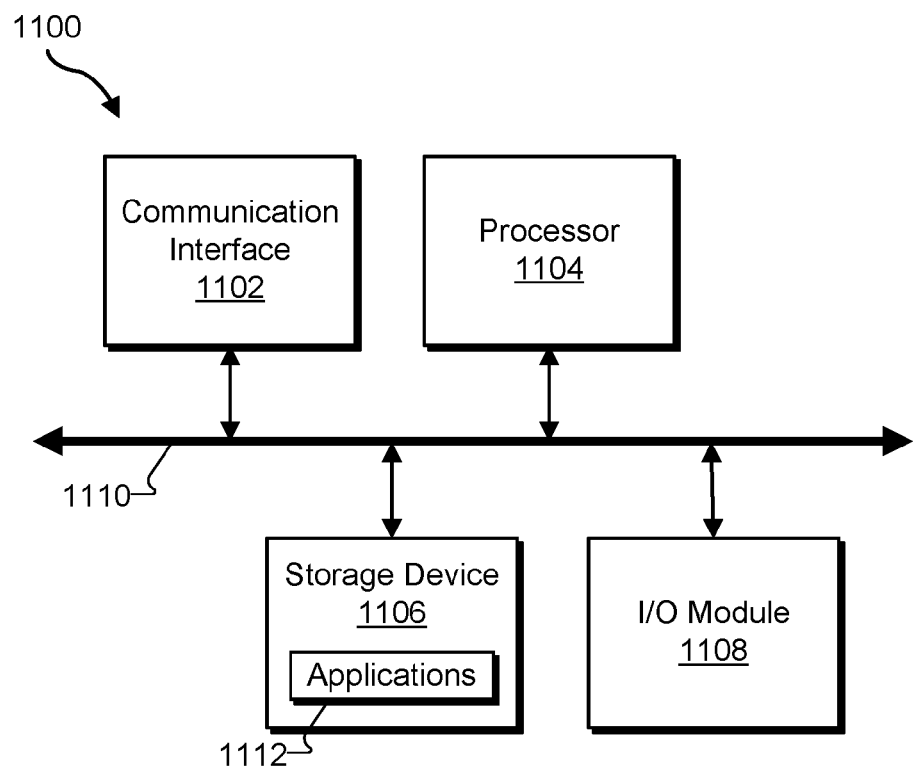
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output (I/O) module 1108 communicatively connected via a communication infrastructure 1110. While an exemplary computing device 1100 is shown in FIG. 11, the components illustrated in FIG. 11 are not intended to be limiting. Additional or alternative components and/or configurations of components may be used in other embodiments. For example, in addition or alternative to being communicatively connected by way of communication infrastructure 1110, one or more components of computing device 1100 may be communicatively connected by way of one or more other suitable interfaces. For instance, communication interface 1102, storage device 1106, I/O module 1108, and/or any other components of computing device 1100 may be communicatively coupled directly to processor 1104 via one or more interfaces (e.g., discrete interfaces). Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, and any other suitable interface. In at least one embodiment, communication interface 1102 may provide a direct connection between system 100 and one or more of provisioning systems via a direct link to a network, such as the Internet. Communication interface 1102 may additionally or alternatively provide such a connection through, for example, a local area network (such as an Ethernet network), a personal area network, a telephone or cable network, a satellite data connection, a dedicated URL, or any other suitable connection. Communication interface 1102 may be configured to interface with any suitable communication media, protocols, and formats, including any of those mentioned above.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory (RAM), dynamic RAM (DRAM), other non-volatile and/or volatile data storage units, or a combination or sub-combination thereof. Electronic data, including data described herein, may be temporarily and/or permanently stored in storage device 1106. For example, data representative of one or more executable applications 1112 (which may include, but are not limited to, one or more of the software applications described herein) configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1100. For example, one or more applications 1112 residing within storage device 1106 may be configured to direct processor 1104 to perform one or more processes or functions associated with system 100 or any components thereof.

To the extent the aforementioned embodiments collect, store, and/or employ personal information provided by individuals (or other entities), it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary implementations have been described with reference to the accompanying drawings. It will, however, be evident that various modifications and changes may be made thereto, and additional implementations may be provided, without departing from the scope of the invention as set forth in the claims that follow. For example, certain features of one implementation described herein may be combined with or substituted for features of another implementation described herein. The description and drawings are accordingly to be regarded in an illustrative rather than a restrictive sense.

What is claimed is:

1. A method comprising:
   detecting, by a personal navigation assistance system, an upcoming trip of a user to a destination based on at least one of
      information included in an email communication associated with the user and
      information included in a text message communication associated with the user;
   accessing, by the personal navigation assistance system, data associated with the upcoming trip from a plurality of disparate information sources;

aggregating, by the personal navigation assistance system, the accessed data associated with the upcoming trip, the aggregated data including real-time parking space availability information;

generating, by the personal navigation assistance system based on the aggregated data, navigational assistance content for the upcoming trip, the navigational assistance content including parking assistance content generated based on the real-time parking space availability information;

providing, by the personal navigation assistance system, the navigational assistance content for the upcoming trip to a mobile computing device for presentation to the user;

detecting, by the personal navigation assistance system, a change in the real-time parking space availability information during the trip;

updating, by the personal navigation assistance system based on the change in the real-time parking space availability information, the navigational assistance content; and providing, by the personal navigation assistance system during the trip, the updated navigational assistance content to the mobile computing device for presentation to the user.

2. The method of claim 1, wherein:
the aggregated data includes information regarding a plurality of parking zones that are geographically proximate to one another;
the generating of the navigational assistance content includes identifying a parking zone included in the plurality of parking zones as being an area where the user is more likely to find an available parking space as compared to at least one other parking zone included in the plurality of parking zones; and
the providing of the navigational assistance content to the mobile computing device includes providing a parking suggestion based on the identified parking zone.

3. The method of claim 1, wherein:
the providing of the navigational assistance content to the mobile computing device includes providing a graphical user interface view for display on a display screen associated with the mobile computing device; and
the graphical user interface view includes at least one of an image of a vehicle currently parked in a parking space and a real-time image associated with the parking space.

4. The method of claim 1, wherein:
the providing of the navigational assistance content to the mobile computing device includes providing a graphical user interface view for display on a display screen associated with the mobile computing device; and
the graphical user interface view includes a map that depicts a geographic layout of a plurality of parking spaces and that includes one or more indicators showing information regarding availability of one or more parking spaces included in the plurality of parking spaces.

5. The method of claim 4, wherein the map comprises a near expiry map and the one or more indicators show a remaining amount of time on one or more parking meters associated with the one or more parking spaces included in the plurality of parking spaces.

6. The method of claim 5, wherein the one or more indicators include one or more graphical objects representing vehicles parked in the one or more parking spaces included in the plurality of parking spaces.

7. The method of claim 1, wherein:
the aggregated data further includes weather forecast information;
the generating of the navigational assistance content includes generating a parking suggestion based at least in part on the weather forecast information; and
the providing of the navigational assistance content to the mobile computing device includes providing the parking suggestion to the mobile computing device for presentation to the user.

8. The method of claim 1, further comprising:
detecting, by the personal navigation assistance system based on the aggregated data, that a vehicle associated with the user is parked in a parking space during the trip;
recording, by the personal navigation assistance system, a geographic location of the parking space; and
providing, by the personal navigation assistance system, parking space return information to the mobile computing device to facilitate the user returning to the parking space after the trip.

9. The method of claim 1, further comprising:
detecting, by the personal navigation assistance system based on the aggregated data, that a vehicle associated with the user is parked in a parking space during the trip; and
providing, by the personal navigation assistance system while the vehicle is parked in the parking space, information to the mobile computing device regarding one or more services that are available to be performed with respect to the vehicle while the vehicle is parked in the parking space during the trip.

10. The method of claim 1, wherein:
the aggregated data includes crowd sourced information that is used to determine a wait time for each of a plurality of airport security lines; and
the providing of the navigational assistance content to the mobile computing device includes suggesting a particular parking space to facilitate the user accessing an airport security line included in the plurality of airport security lines that has a shortest wait time.

11. The method of claim 1, embodied as computer-executable instructions on at least one non-transitory computer-readable medium.

12. A method comprising:
receiving, by a mobile computing device, navigational assistance content associated with a detected upcoming trip of a user to a destination, the navigational assistance content generated based on data that is associated with the upcoming trip, that is accessed from a plurality of disparate information sources, and that includes parking assistance content generated based on real-time parking space availability information, the upcoming trip detected based on at least one of
information included in an email communication associated with the user and information included in a text message communication associated with the user;
providing, by the mobile computing device, the navigational assistance content for display on a display screen associated with the mobile computing device;
receiving, by the mobile computing device, updated navigational assistance content that is updated based on a change in the real-time parking space availability information during the trip; and providing, by the mobile computing device during the trip, the updated navigational assistance content for display on the display screen.

13. The method of claim 12, wherein:
the providing of the navigational assistance content includes providing a graphical user interface view for display on the display screen; and
the graphical user interface view includes a map that depicts a plurality of parking spaces and that includes one or more indicators showing information regarding availability of one or more parking spaces included in the plurality of parking spaces.

14. The method of claim 12, embodied as computer-executable instructions on at least one non-transitory computer-readable medium.

15. A system comprising:
at least one physical computing device that:
detects an upcoming trip of a user to a destination based on at least one of
information included in an email communication associated with the user and
information included in a text message communication associated with the user;
accesses data associated with the upcoming trip from a plurality of disparate information sources;
aggregates the accessed data associated with the upcoming trip, the aggregated data including real-time parking space availability information;
generates, based on the aggregated data, navigational assistance content for the upcoming trip, the navigational assistance content including parking assistance content generated based on the real-time parking space availability information;
provides the navigational assistance content for the upcoming trip to a mobile computing device for presentation to the user;
detects a change in the real-time parking space availability information during the trip;
updates the navigational assistance content based on the change in the real-time parking space availability information; and
provides the updated navigational assistance content to the mobile computing device during the trip for presentation to the user.

16. The system of claim 15, wherein:
the at least one physical computing device provides the navigational assistance content to the mobile computing device by providing a graphical user interface view for display on a display screen associated with the mobile computing device; and
the graphical user interface view includes a map that depicts a plurality of parking spaces and that includes one or more indicators showing information regarding availability of one or more parking spaces included in the plurality of parking spaces.

17. The system of claim 15, wherein:
the at least one physical computing device provides the navigational assistance content to the mobile computing device by providing a graphical user interface view for display on a display screen associated with the mobile computing device; and
the graphical user interface view includes at least one of an image of a vehicle currently parked in a parking space and a real-time image associated with the parking space.

* * * * *